W. C. BRIDGES.
VELOCIPEDE.
APPLICATION FILED APR. 9, 1920.
1,395,552.
Patented Nov. 1, 1921.
2 SHEETS—SHEET 1.
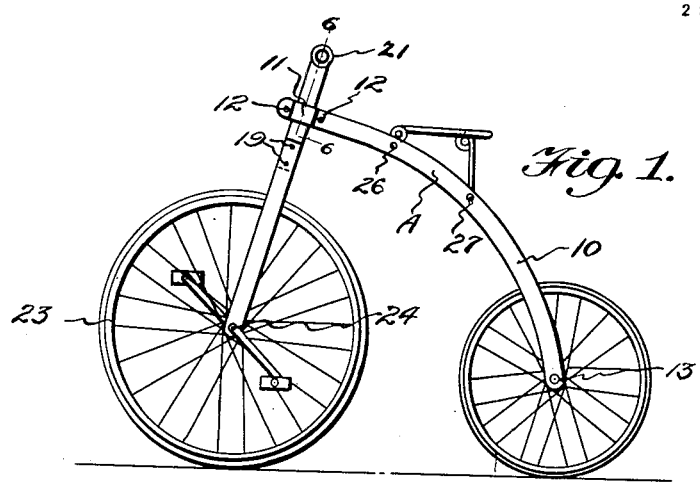
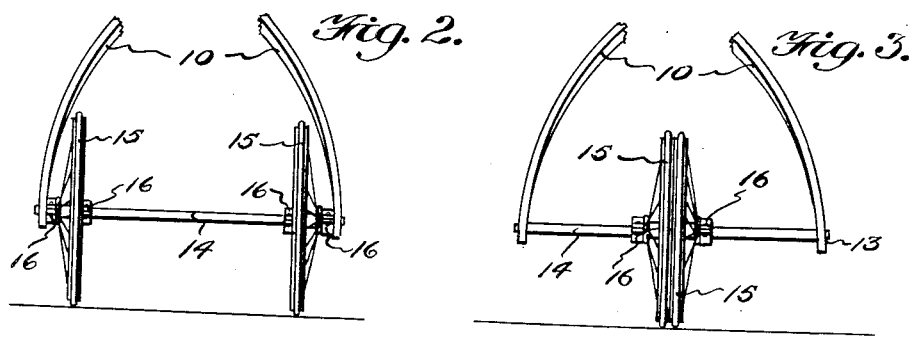
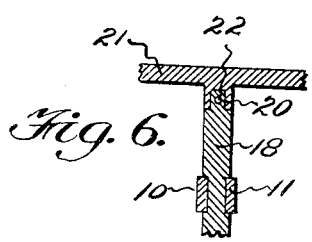
W. C. Bridges
INVENTOR
BY Victor J. Evans
ATTORNEY W. C. BRIDGES.
VELOCIPEDE.
APPLICATION FILED APR. 9, 1920.
1,395,552.
Patented Nov. 1, 1921.
2 SHEETS—SHEET 2.
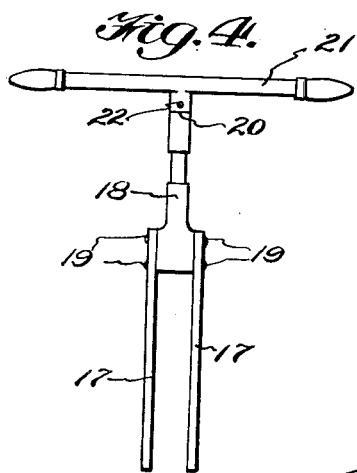
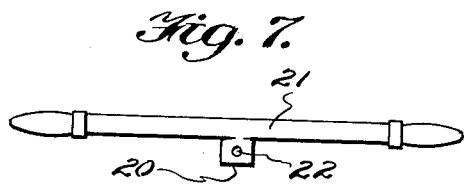
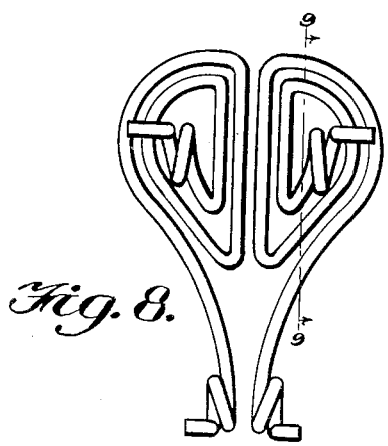
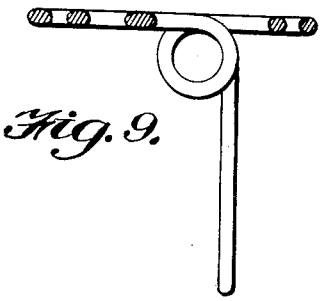
W. C. Bridges
INVENTOR
WITNESS:
BY Victor J. Evans
ATTORNEY

UNITED STATES PATENT OFFICE.

WILLIAM C. BRIDGES, OF NORTH EASTON, MASSACHUSETTS.

VELOCIPEDE.

1,395,552.   Specification of Letters Patent.   Patented Nov. 1, 1921.

Application filed April 9, 1920. Serial No. 372,564.

*To all whom it may concern:*

Be it known that I, WILLIAM C. BRIDGES, a citizen of the United States of America, residing at North Easton, in the county of Bristol and State of Massachusetts, have invented new and useful Improvements in Velocipedes, of which the following is a specification.

This invention comprehends the provision of a velocipede wherein the component parts are detachably connected so that they can be compactly arranged for shipment and transportation, and readily and easily assembled for use by the purchaser.

Another object of importance resides in the provision of a device above mentioned wherein the two rear wheels are capable of sliding adjustment upon the rear axle, so that the wheels can be brought together in contacting engagement to convert the device into a bicycle.

The nature and advantages of the invention will be better understood when the following detailed description is taken in connection with the accompanying drawings, the invention residing in the construction, combination and arrangement of parts as claimed.

In the drawings forming part of this application, like numerals of reference indicate similar parts in their several views and wherein:—

Figure 1 is a side elevation of a velocipede constructed in accordance with the invention.

Fig. 2 is a rear elevation showing the rear wheels spaced.

Fig. 3 is a similar view showing the wheels brought together when the device is converted into a bicycle.

Fig. 4 is a front elevation of the fork-head and handle bars associated.

Fig. 5 is a plan view of the same.

Fig. 6 is a sectional view taken on the line 6—6 of Fig. 1.

Fig. 7 is a detailed view of the handle bars.

Fig. 8 is a detailed view of the seat.

Fig. 9 is a sectional view taken on the line 9—9 of Fig. 8.

Referring to the drawings in detail, A indicates generally the frame of the velocipede, the frame including the two curved pieces or members 10 each of which is bulged as at 11 at a point adjacent their forward extremity, the said extremities being in contact engagement and secured together by means of fastening elements 12 at both sides of the bulged portions. The opposite ends of the members 10 are provided with openings 13 for the reception of the rear axle 14 upon which is mounted the wheels 15. The wheels are susceptible of sliding adjustment upon the axle 14, and are held properly spaced when the device is used as a velocipede by means of the clamps 16. Two of these clamps, which are preferably made in sections, are provided for each wheel and arranged on the axle 14 at opposite sides of the wheel as clearly illustrated.

The front forks include the spaced members 17, which are detachably secured to the adjacent extremity of the head 18 of the velocipede which partly projects between the forks and is connected thereto as at 19. The head 18 is received between the opposed bulged portions 11 of the frame as shown. The head 18 projects an appreciable distance above the frame, and has its upper end seated in a socket 20 formed intermediate of the handle bar 21. Suitable fastening elements 22 hold these parts associated. The front wheel is indicated at 23 and is fixed upon the axle 24 journaled in the forked members 17; the axle is provided with crank portions and pedals in the usual manner.

In Figs. 8 and 9, I have disclosed the saddle of the velocipede which is preferably constructed of wire. The seat is made in two sections, and the corresponding terminals of the wire of respective sections are inserted into the openings 26 of the frame members 10, while the opposite terminals of the wires are passed through alined openings 27 of the frame members. By reason of the construction shown and described, it is manifest that the forks, the head, the handle, the frame and frame bars, the saddle and also the front and rear wheels can be readily and easily disassembled and conveniently packed for shipment, and just as easily reassembled for the use of the purchaser. The construction also provides the conversion of the device from a velocipede into a bicycle this being accomplished by moving the wheels 15 toward each other and into contacting engagement at a point midway on the axle 14. The wheels are held associated by means of two clamps 16, two of the clamps shown in the rear elevations being eliminated in this instance. For the purpose mentioned, the wheels 15 have their confronting faces straight so that they can be properly associated. The invention is simple in construction, and can be manufactured and sold at a nominal cost.

While it is believed that from the foregoing description the nature and advantages of the invention will be readily apparent, I desire to have it understood that I do not limit myself in this connection and such changes may be resorted to as fall within the scope of the appended claim.

What I claim is:—

A velocipede comprising a pair of arcuate frame bars secured together intermediate their ends and having their lower ends diverging whereby to constitute a rear fork, the forward ends of said frame bars being disposed together and being formed near the extremity with outwardly curved portions which mate to define a collar, a head having a reduced portion revolubly engaged within said collar, a handle bar at the upper end of said head, a front fork carried by the lower portion of said head, a crank axle journaled through the lower end of said front fork and provided with pedals, a front wheel on said front axle within the front fork, a rear axle extending across the lower extremities of the frame bars, a pair of rear wheels rotatable upon said rear axle and slidable thereon whereby to dispose in contacting relation at the center thereof or at the ends thereof, and members secured upon said rear axle and engageable with said wheels whereby to hold in the latter in selected position.

In testimony whereof I affix my signature.

WILLIAM C. BRIDGES.